United States Patent
Tsutsui

(10) Patent No.: US 7,505,509 B2
(45) Date of Patent: Mar. 17, 2009

(54) RECEIVING COMMUNICATION APPARATUS USING ARRAY ANTENNA

(75) Inventor: Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 521 days.

(21) Appl. No.: 11/112,205

(22) Filed: Apr. 22, 2005

(65) Prior Publication Data

US 2005/0185703 A1    Aug. 25, 2005

Related U.S. Application Data

(63) Continuation of application No. PCT/JP03/04124, filed on Mar. 21, 2003.

(51) Int. Cl.
*H04B 1/00* (2006.01)

(52) U.S. Cl. ............... 375/148; 375/147; 375/316; 375/343

(58) Field of Classification Search ............... 375/316, 375/140–153, 343, 346–354
See application file for complete search history.

(56) References Cited

U.S. PATENT DOCUMENTS

| | | | |
|---|---|---|---|
| 5,533,064 A * | 7/1996 | Ichihara | 375/340 |
| 6,064,338 A * | 5/2000 | Kobayakawa et al. | 342/378 |
| 6,349,218 B1 * | 2/2002 | Nakagawa et al. | 455/562.1 |
| 6,351,238 B1 * | 2/2002 | Kishigami et al. | 342/445 |
| 6,385,181 B1 * | 5/2002 | Tsutsui et al. | 370/335 |
| 6,421,000 B1 * | 7/2002 | McDowell | 342/357.06 |
| 6,470,043 B1 * | 10/2002 | Lo et al. | 375/144 |
| 6,501,943 B1 * | 12/2002 | Ide et al. | 455/101 |
| 6,529,745 B1 * | 3/2003 | Fukagawa et al. | 455/562.1 |
| 6,670,919 B2 * | 12/2003 | Yoshida | 342/378 |
| 6,714,584 B1 * | 3/2004 | Ishii et al. | 375/148 |
| 6,813,309 B1 * | 11/2004 | Ogino | 375/148 |
| 6,882,681 B2 * | 4/2005 | Sano | 375/148 |
| 6,904,076 B1 * | 6/2005 | Tsutsui et al. | 375/130 |
| 6,922,450 B2 * | 7/2005 | Yuda et al. | 375/316 |
| 6,944,208 B2 * | 9/2005 | Miyoshi et al. | 375/148 |
| 6,959,070 B2 * | 10/2005 | Miya | 379/67.1 |
| 6,959,169 B2 * | 10/2005 | Miyoshi | 455/63.1 |
| 6,968,211 B2 * | 11/2005 | Miya | 455/562.1 |
| 7,003,324 B2 * | 2/2006 | Hiramatsu | 455/562.1 |
| 7,016,399 B1 * | 3/2006 | Vadgama et al. | 375/148 |
| 7,095,984 B2 * | 8/2006 | Hoshino | 455/67.16 |

(Continued)

FOREIGN PATENT DOCUMENTS

EP    0 978 969    1/2004

(Continued)

OTHER PUBLICATIONS

International Search Report dated Apr. 30, 2003.

*Primary Examiner*—Chieh M Fan
*Assistant Examiner*—Jason M. Perilla
(74) *Attorney, Agent, or Firm*—Katten Muchin Rosenman LLP

(57) ABSTRACT

Correlation with a spreading code is done for each of the signals received by a plurality of antennas forming an array antenna (10); then, beam forming (18) is performed using the result of the correlation, and a delay profile is generated (20, 22, 26) from the result of the beam forming, thereby achieving accurate path detection (26). DOA information obtained for the beam forming (18) can also be used as an initial value to be given to a beam former (33) in a received signal processor (14).

4 Claims, 4 Drawing Sheets

U.S. PATENT DOCUMENTS

| | | |
|---|---|---|
| 7,117,016 B2 * | 10/2006 | Kisigami et al. .......... 455/562.1 |
| 7,161,976 B2 * | 1/2007 | Sano .......................... 375/148 |
| 7,209,512 B2 * | 4/2007 | Jitsukawa et al. ........... 375/148 |
| 2001/0049295 A1 * | 12/2001 | Matsuoka et al. ........... 455/562 |
| 2002/0135514 A1 | 9/2002 | Yoshida |
| 2002/0181561 A1 * | 12/2002 | Sano .......................... 375/148 |
| 2003/0012267 A1 * | 1/2003 | Jitsukawa et al. ........... 375/148 |
| 2003/0067971 A1 * | 4/2003 | Miyoshi et al. ............. 375/150 |
| 2004/0174300 A1 | 9/2004 | Nakagawa |
| 2004/0204113 A1 * | 10/2004 | Kisigami et al. .......... 455/562.1 |
| 2005/0074071 A1 * | 4/2005 | Papathanasiou et al. ..... 375/267 |
| 2005/0185703 A1 * | 8/2005 | Tsutsui ....................... 375/150 |

FOREIGN PATENT DOCUMENTS

| | | |
|---|---|---|
| EP | 1 398 888 | 3/2004 |
| JP | 2000-59269 | 2/2000 |
| JP | 2002-084216 | 3/2002 |
| JP | 2002-237766 | 8/2002 |
| JP | 2003-8483 | 1/2003 |
| WO | WO 02/103927 | 12/2000 |

* cited by examiner

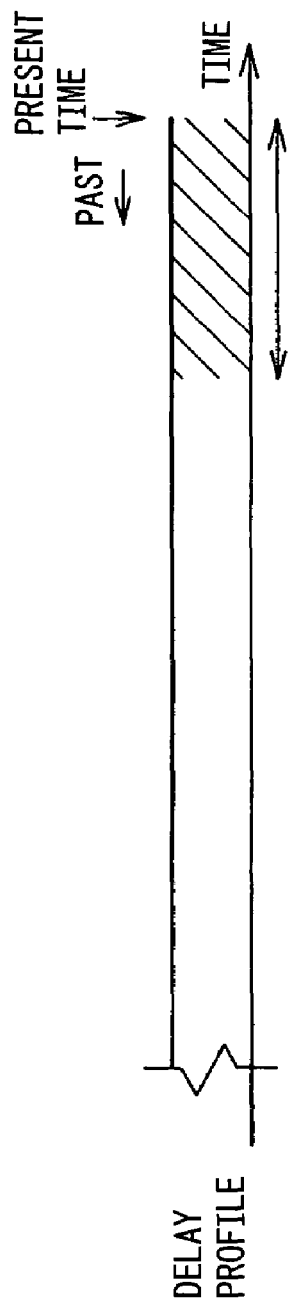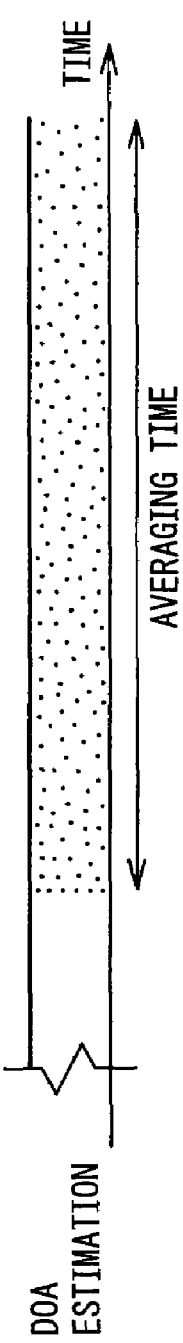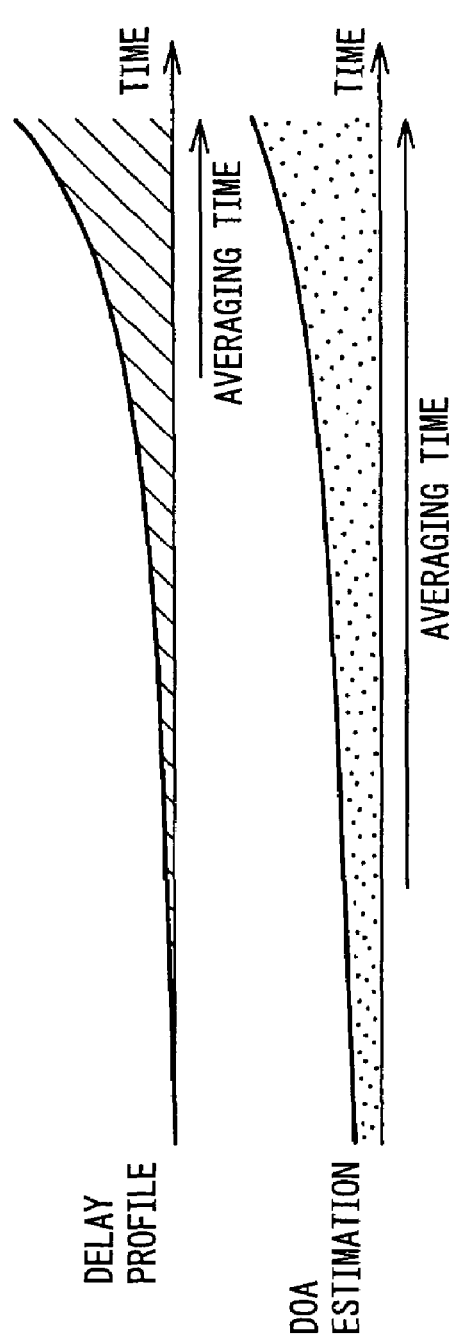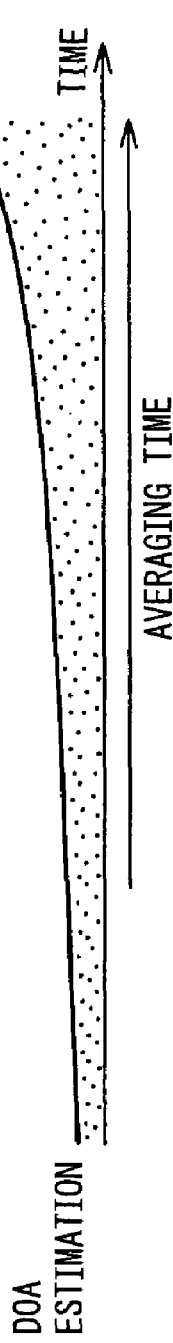
Fig.4a
Fig.4b
Fig.5a
Fig.5b

RECEIVING COMMUNICATION APPARATUS USING ARRAY ANTENNA

CROSS-REFERENCE TO RELATED APPLICATION

This application is a continuation of PCT/JP03/04124, filed on Mar. 31, 2003, the contents being incorporated herein by reference.

TECHNICAL FIELD

The present invention relates to path detection and direction-of-arrival estimation techniques for use in a receiving apparatus in wireless communication equipment that uses an array antenna.

PRIOR ART

In a DS-CDMA mobile communication system, as the radiowave transmitted from each mobile unit arrives at a base station over multiple paths with different delay times due to reflections from obstacles such as buildings, a technique called RAKE receiving is employed that gathers the received signals from the multiple paths and combines them into one signal. A receiving apparatus that performs RAKE receiving is equipped with a searcher for determining path timing, i.e., the phase of the despreading code to be applied to each RAKE finger. The searcher performs correlation using a matched filter to correlate each received signal with a prescribed code, obtains a delay profile by adding up its output, and obtains the path timing by detecting a peak in the delay profile.

It is expected that, if the wireless communication equipment at the above base station is equipped with an array antenna so that the antenna directivity (the direction of the beam formed by a beam former) can be adaptively changed according to the direction of the mobile unit, the number of mobile units that can be served by the base station can be increased. In that case, as the transmit power of each mobile unit is controlled to an even lower level, it becomes necessary to further enhance the path detection accuracy of the searcher.

Patent Document 1, shown below, describes that the correlation results obtained for a plurality of antennas forming an array antenna are converted into power values and a delay profile is generated by simply summing the power values. Patent Document 1 further describes that corrections between the respective antennas are computed from the plurality of correlation results and their sum is used as an initial value for a beam former in a receiver section so that the reception can be started by making the weight to be applied to the beam former to converge immediately after achieving synchronization by the searcher.

Patent Document 1

Japanese Unexamined Patent Publication No. 2002-84216

However, the above Patent Document 1 has the problem that there is a limit to the extent to which the path detection and the accuracy can be improved because the delay profile is obtained by simply combining the power values of the correlation results obtained from the plurality of radiowaves arriving with different phases.

DISCLOSURE OF THE INVENTION

An object of the present invention is to enhance the accuracy of path detection in a receiving apparatus that employs an array antenna.

According to the present invention, there is provided a receiving apparatus comprising a receiving section for performing RAKE receiving with a plurality of fingers and a searcher for detecting path timing to be given to each of the fingers of the receiving section, each of the fingers of the receiving section comprising a first beam former for performing beam forming based on signals received from a plurality of antennas forming an array antenna, wherein the searcher comprises: a plurality of correlators, each for performing correlation processing on the signal received from each of the plurality of antennas; a direction-of-arrival calculator for estimating direction of arrival based on outputs of the plurality of correlators; a second beam former for performing beam forming on the outputs of the plurality of correlators in accordance with an estimation result supplied from the direction-of-arrival calculator; and a path detector for detecting the path timing based on an output of the second beam former.

The estimation result from the direction-of-arrival calculator can be used in the first beam former.

The estimation result from the direction-of-arrival calculator can also be used in a third beam former provided in a transmitting apparatus.

Preferably, the receiving apparatus further comprises a delay circuit which is placed after the plurality of correlators and before the second beam former.

Also preferably, the receiving apparatus further comprises a first averager which is placed after the second beam former and before the path detector, and which averages the output of the second beam former with a first averaging time constant, and the direction-of-arrival estimator includes a calculator for performing calculations to estimate the direction of arrival by receiving the outputs of the plurality of correlators, and a second averager for averaging an output of the calculator with a second averaging time constant which is different from the first averaging time constant.

BRIEF DESCRIPTION OF THE DRAWINGS

FIGS. 4a, 4b, 5a, and 5b are diagrams each showing the relationship between delay profile averaging time and DOA profile averaging time.

BEST MODE FOR CARRYING OUT THE INVENTION

Figure 1:
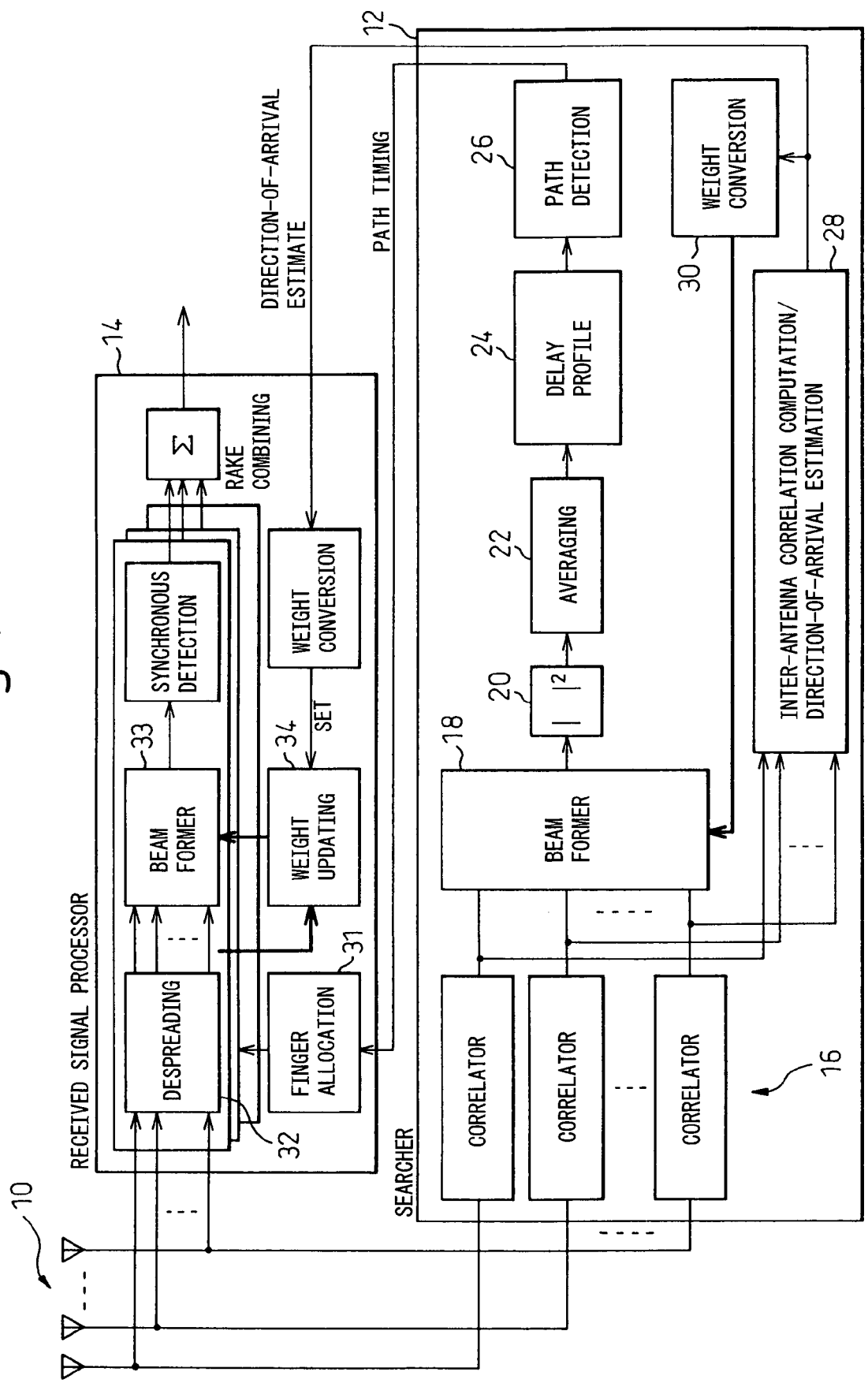
FIG. 1 is a diagram showing the configuration of a receiver according to one embodiment of the present invention.

FIG. 1 shows the configuration of a receiver according to one embodiment of the present invention.

A radio-frequency signal received by each antenna in an array antenna 10 is first converted by a frequency converter and a quadrature demodulator, not shown, into a baseband signal comprising I-phase and Q-phase components, and then sampled and quantized by an A/D converter, not shown, into a complex-valued digital baseband signal which is supplied to a searcher 12 for path timing detection and a received signal processor 14 for adaptive array reception.

The searcher 12 of the present invention accepts at its inputs all the antenna signals supplied from the array antenna 10, and each received signal is correlated with a spreading code by a correlator 16 provided for each antenna. The correlated signal of each antenna is fed to a beam former 18 which forms a beam in the direction of arrival of the signal;

then, by performing power conversion (20) and time averaging (22), a delay profile 24 is generated to perform path detection (26) achieving a beam forming gain. The weight to be applied to the beam former 18 in the searcher 12 is obtained by estimating the direction of arrival (DOA) using the correlated signal of each antenna (28) in the searcher 12 and by converting it into a weight (30). Information of the path timing estimated by the searcher 12 is used for finger allocation 31 and despreading 32 in the array antenna received signal processor 14, while the DOA information can be used as DOA information in a weight updater 34 of a beam former 33 or as its initial value. By using as its initial value the DOA information obtained by the searcher 12, the received signal processor 14 can initiate the receiving process immediately after synchronization is achieved by the searcher 12. The DOA information obtained by the searcher can also be used as DOA information for a beam former provided in a transmitting section not shown.

Thus, in a wireless communication system using an array antenna, even when the received signal intensity per antenna element is reduced, stable path detection with high sensitivity can be performed, achieving high-quality receiving characteristics. At the same time, estimation of the direction of arrival can also be performed. It is also possible to detect paths for signals that are arriving from directions other than the beam direction and that can cause a problem when forming the beam by the array antenna.

Figure 2:
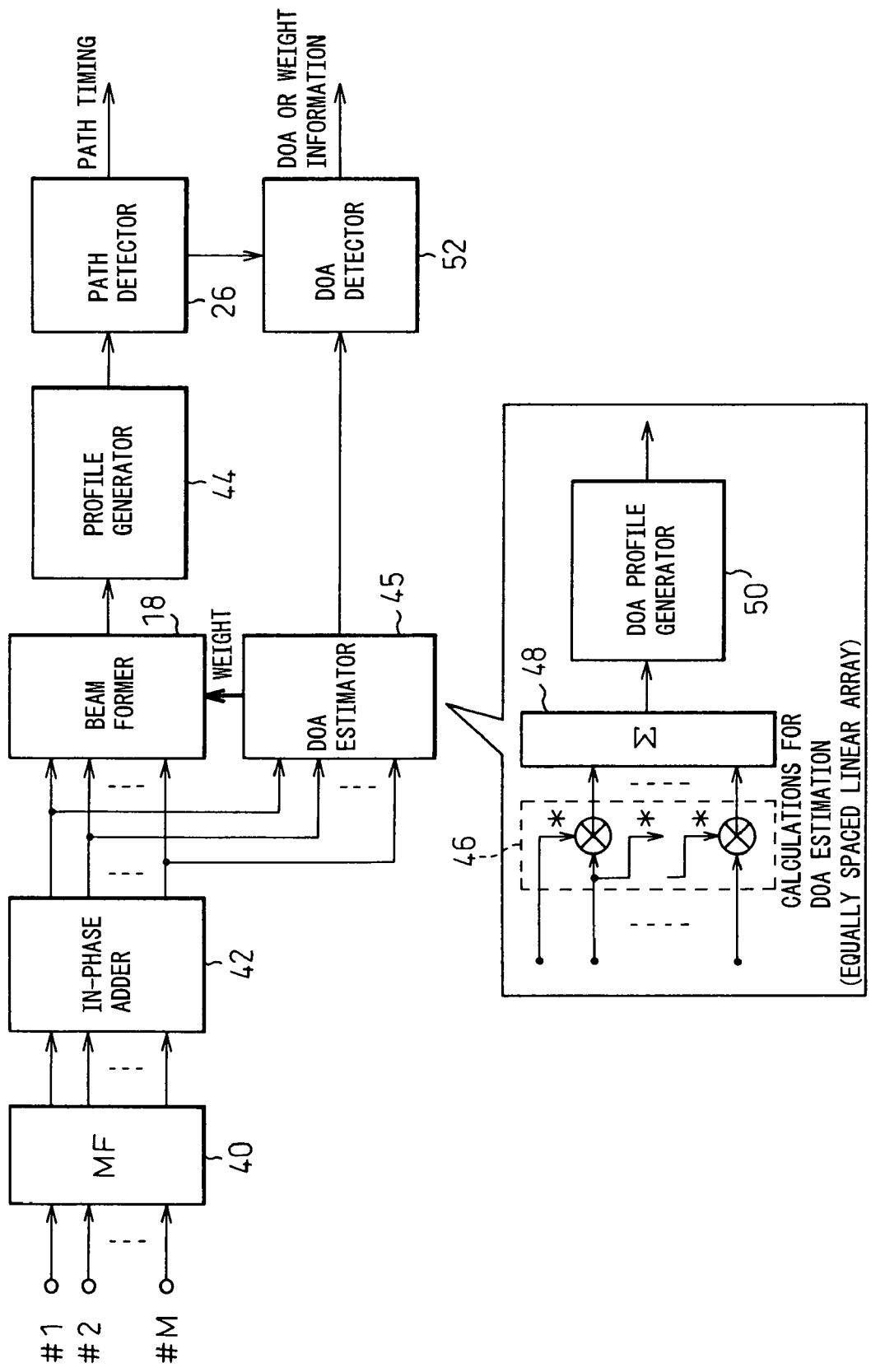
FIG. 2 is a diagram showing one example of processing in a searcher 12 in FIG. 1.

A specific configuration for implementing the processing performed in the searcher 12 described with reference to FIG. 1 is illustrated in FIG. 2 in block diagram form.

The in-phase processing 16 in FIG. 1 is implemented in a matched filter 40 and an in-phase adder 42 in FIG. 2. The signals received by the respective antennas in the array antenna are each correlated with a spreading code in the matched filter 40 and are added in phase on a symbol-by-symbol basis in the in-phase adder 42. After the in-phase addition, each antenna signal is used for beam forming (18). The signal after the beam forming is multiplied by a complex conjugate and thus converted into power, and then averaged over time to generate the power delay profile (44), and detection of an effective path is performed (26) based on a threshold value.

Next, a method of DOA estimation will be described. The signals added in phase for the respective antennas can be used for DOA estimation by estimating the received phase difference between the respective antennas. In particular, when the array antenna is of an equally spaced linear array configuration, then, in a DOA estimator/calculator 45 whose details are shown in FIG. 2, a complex multiplication is performed between adjacent antennas (46) (here, a complex conjugate is used as the reference side as shown by *), all the outputs are complex-added as they are equally spaced apart (48), and the sum is averaged over time (50), thereby obtaining correlation between the antennas and thus estimating the DOA. Here, the profile obtained by the time averaging and necessary for the DOA estimation is called the DOA profile. The DOA estimate is converted into a weight (30 in FIG. 1) which is used as the weight for the beam forming for generating the delay profile. Further, in a DOA detector 52, by referring to the value of the DOA profile at the detected path timing, DOA information for each path can be obtained.

Figure 3:
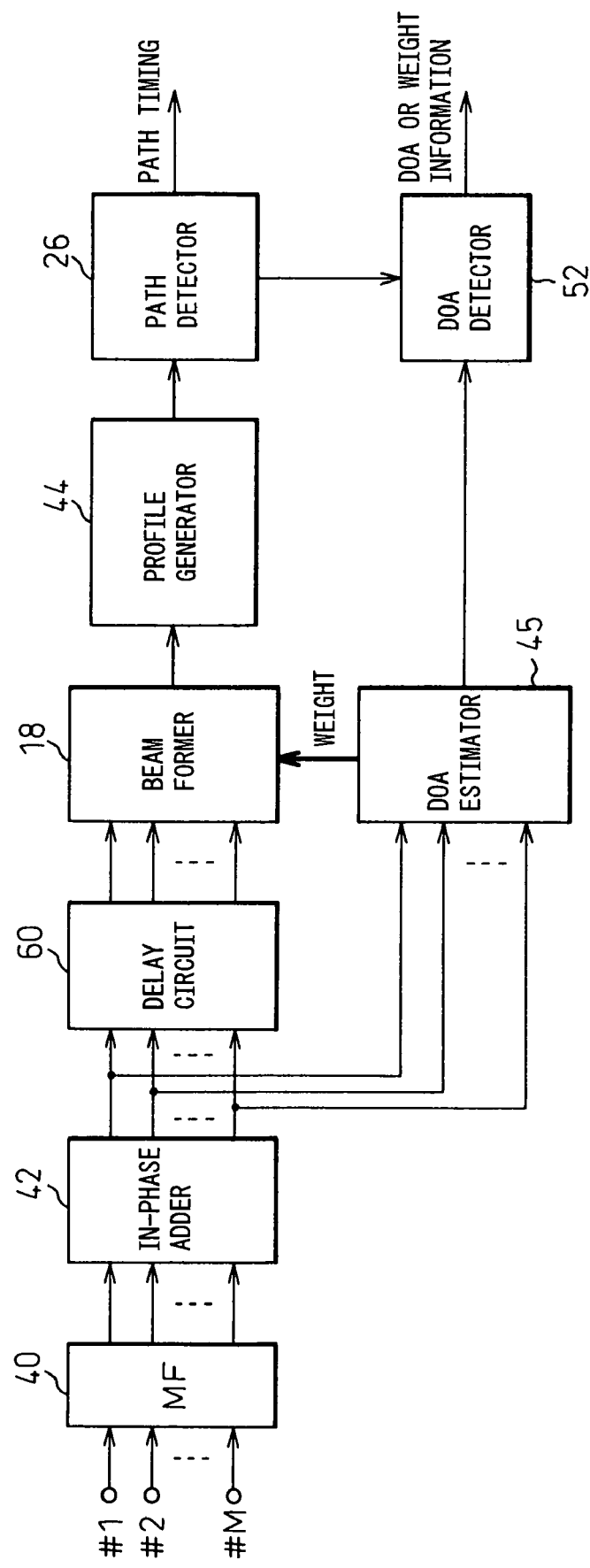
FIG. 3 is a diagram showing another example of processing in the searcher 12 in FIG. 1.

FIG. 3 shows another example of the processing performed in the searcher. In the example of FIG. 2, the profile cannot be generated based on the beam forming until after the weight for the beam former is first set by performing the first DOA estimation. This does not present much of a problem when performing path searching on signals arriving in succession but, in the case of a signal arriving and completing in a short single burst, there can occur cases where when the weight is successfully estimated, the signal is already completed and the beam forming cannot be performed; in such cases, path detection or signal detection cannot be performed utilizing the effect of the array antenna. In view of this, in the example shown in FIG. 3, a delay circuit 60 is provided before the beam former 18 to delay the signal until the weight is obtained by estimating the DOA; this makes it possible to receive a short bursty signal while also making it possible to perform path detection by performing beam forming at all times.

Further, it is desirable that the averaging time for the delay profile in the profile generator 44 and the averaging time for the DOA estimation in the DOA profile generator 50 (FIG. 2) be made unequal to each other. The reason is that, if the delay profile averaging time and the DOA estimation averaging time are equal and become synchronized to each other, since the source of both profiles is the same signal which contains noise, beam forming is also performed for the noise, defeating the purpose of the beam forming that suppresses the noise. FIGS. 4a and 4b show the averaging time in the case of a moving average, and FIGS. 5a and 5b show the averaging time in the case of an exponential average. Each figure shows the case where the DOA estimation averaging time is set longer than the delay profile averaging time, but conversely, the delay profile averaging time may be set longer. By making the averaging time for the delay profile generation and that for the DOA estimation unequal to each other, or by performing the delay profile generation and the DOA estimation at different times, correlation can be prevented from occurring between the weights during the noise interval.

ADVANTAGEOUS EFFECT OF THE INVENTION

As beam forming is performed using an array antenna, and path detection is performed by generating a delay profile, the searcher of the prevent invention can achieve highly accurate path searching and direction-of-arrival estimation,.

Accordingly, when the array antenna is applied to a CDMA mobile communication system, it becomes possible to suppress the degradation of the path searching characteristics as well as the increase in transmit power due to incompleteness of the formed beam. As a result, in a CDMA system in which the system capacity is limited according to the amount of interference from other users, the system capacity can be increased, without causing degradation in characteristics, when applying the array antenna.

The invention claimed is:

1. A receiving apparatus comprising a receiving section for performing RAKE receiving with a plurality of fingers and a searcher for detecting path timings to be given to each of the fingers of the receiving section, each of the plurality of fingers of the receiving section comprising a first beam former for performing beam forming based on signals received from a plurality of antennas forming an array antenna, wherein the searcher comprises:

a plurality of correlators, each for performing correlation processing on the signals received from a respective one of the plurality of antennas;

a delay circuit placed after the plurality of correlators receiving outputs of the plurality of correlators;

a direction-of-arrival calculator for estimating direction of arrival based on the outputs of the plurality of correlators;

a second beam former for performing beam forming on outputs of the delay circuit in accordance with an estimation result supplied from the direction-of-arrival calculator; and a path detector for detecting the timing based on an output of the second beam former, wherein the direction-of-arrival calculator performs complex multiplication between adjacent ones of the plurality of antennas to determine the direction of arrival estimation result.

2. A receiving apparatus according to claim 1, wherein the estimation result from the direction-of-arrival calculator is used in the first beam former.

3. A receiving apparatus according to claim 1, wherein the estimation result from the direction-of-arrival calculator is used in a third beam former provided in a transmitting apparatus.

4. A receiving apparatus according to claim 1, further comprising a first averager which is placed after the second beam former and before the path detector, and which averages the output of the second beam former with a first averaging time constant, and wherein the direction-of-arrival estimator includes a calculator for performing calculations to estimate the direction of arrival by receiving the outputs of the plurality of correlators, and a second averager for averaging an output of the calculator with a second averaging time constant which is different from the first averaging time constant.

* * * * *

UNITED STATES PATENT AND TRADEMARK OFFICE
CERTIFICATE OF CORRECTION

PATENT NO. : 7,505,509 B2
APPLICATION NO. : 11/112205
DATED : March 17, 2009
INVENTOR(S) : Masafumi Tsutsui It is certified that error appears in the above-identified patent and that said Letters Patent is hereby corrected as shown below:

The title page showing the Related U.S. Application Data, should be deleted and add therefore the following:

--(63)    Related U.S. Application Data

Continuation of application No. PCT/JP03/04124, filed on Mar. 31, 2003.--

Signed and Sealed this

Second Day of February, 2010

David J. Kappos
*Director of the United States Patent and Trademark Office*